US012709657B2

(12) United States Patent
Kim et al.

(10) Patent No.: US 12,709,657 B2
(45) Date of Patent: Aug. 18, 2026

(54) CURABLE COMPOSITION, CURED LAYER USING THE COMPOSITION, COLOR FILTER INCLUDING THE CURED LAYER AND DISPLAY DEVICE INCLUDING THE COLOR FILTER

(71) Applicant: SAMSUNG SDI CO., LTD., Yongin-si (KR)

(72) Inventors: Jonggi Kim, Suwon-si (KR); Yonghee Kang, Suwon-si (KR); Kyunghee Kang, Suwon-si (KR); Jihyeon Yim, Suwon-si (KR); Bumjin Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 701 days.

(21) Appl. No.: 17/976,526

(22) Filed: Oct. 28, 2022

(65) Prior Publication Data

US 2023/0322983 A1 Oct. 12, 2023

(30) Foreign Application Priority Data

Mar. 28, 2022 (KR) ........................ 10-2022-0038278

(51) Int. Cl.
*C08F 136/20* (2006.01)
*C08K 3/30* (2006.01)
(Continued)

(52) U.S. Cl.
CPC .............. *C08F 136/20* (2013.01); *C08K 3/30* (2013.01); *C08K 5/375* (2013.01); *C08K 9/06* (2013.01)

(58) Field of Classification Search
CPC .. C08K 9/06; C08K 3/30; C08K 5/375; C08F 136/20
See application file for complete search history.

(56) References Cited

U.S. PATENT DOCUMENTS

2006/0040103 A1* 2/2006 Whiteford .............. B82Y 30/00 428/403
2011/0034038 A1 2/2011 Chen et al.
(Continued)

FOREIGN PATENT DOCUMENTS

CN 109616328 A 4/2019
CN 114077161 A 2/2022
(Continued)

OTHER PUBLICATIONS

Taiwanese Office Action (including a search report) dated Nov. 8, 2023, of the corresponding Taiwanese Patent Application No. 111138730 (8 pages).
(Continued)

*Primary Examiner* — Arrie L Reuther
(74) *Attorney, Agent, or Firm* — Womble Bond Dickinson (US) LLP

(57) ABSTRACT

A curable composition, a cured layer manufactured using the curable composition, a color filter including the cured layer, and a display device including the color filter, the curable composition including a quantum dot surface-modified with a first ligand and a second ligand having a structure different than the first ligand; and a polymerizable compound is provided. The first ligand is a silsesquioxane-based thiol ligand.

20 Claims, 1 Drawing Sheet

(51) Int. Cl.

| | |
|---|---|
| ***C08K 5/375*** | (2006.01) |
| ***C08K 9/06*** | (2006.01) |

(56) References Cited

U.S. PATENT DOCUMENTS

| | | | | |
|---|---|---|---|---|
| 2014/0275598 | A1 | 9/2014 | Freeman et al. | |
| 2019/0115507 | A1 | 4/2019 | Kim et al. | |
| 2019/0276734 | A1* | 9/2019 | Kim | H10K 50/115 |
| 2020/0231871 | A1 | 7/2020 | Kim et al. | |
| 2022/0056334 | A1 | 2/2022 | Lee et al. | |

FOREIGN PATENT DOCUMENTS

| | | | |
|---|---|---|---|
| JP | 2008-502169 | A | 1/2008 |
| JP | 2008-505773 | A | 2/2008 |
| JP | 2019-109515 | A | 7/2019 |
| JP | 2020-118971 | A | 8/2020 |
| JP | 2022-036029 | A | 3/2022 |
| KR | 10-2007-0022856 | A | 2/2007 |
| KR | 10-2018-0073446 | A | 7/2018 |
| KR | 10-2018-0106126 | A | 10/2018 |
| KR | 10-2018-0119223 | A | 11/2018 |
| KR | 10-2019-0106819 | A | 9/2019 |
| KR | 10-2019-0115950 | A | 10/2019 |
| KR | 10-2020-0090493 | A | 7/2020 |
| KR | 10-2020-0114869 | A | 10/2020 |
| KR | 10-2204761 | B1 | 1/2021 |
| KR | 10-2022-0023000 | A | 3/2022 |
| TW | 200621861 | A | 7/2006 |
| TW | 201923026 | A | 6/2019 |

OTHER PUBLICATIONS

Wang, Yu et al., "Polyhedral Oligomeric Silsesquioxan as a Ligand for CdSe Quantum Dots", The Journal of Physical Chemistry C, Jan. 17 2013, vol. 117, No. 4, p. 1857-1862, DOI:org/10.1021/jp3112843 (6 pages).

Li Qi et al., "Self-assembled quantum dots-polyhedral oligomeric silsesquioxane nanohybrids with enhanced photoluminescence" (2012) Scripta Materialia 66(9), 646-649; doi:10.1016/j.scriptamat.2012.01.047 (4 pages).

Wang, et al. "Preparation of POSS modified quantum dots and their PVB composite materials" (2010), including English Abstract; https:/www.cnki.net (31 pages).

Chinese Office Action (including a search report) dated Aug. 3, 2024, of the corresponding Chinese Patent Application No. 202211271869.0 (10 pages).

* cited by examiner

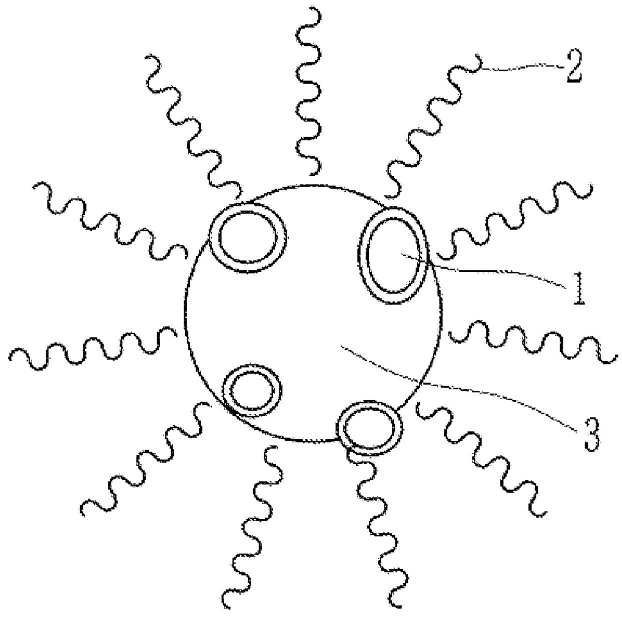
2
1
3

CURABLE COMPOSITION, CURED LAYER USING THE COMPOSITION, COLOR FILTER INCLUDING THE CURED LAYER AND DISPLAY DEVICE INCLUDING THE COLOR FILTER

CROSS-REFERENCE TO RELATED APPLICATION

This application claims priority to and the benefit of Korean Patent Application No. 10-2022-0038278 filed in the Korean Intellectual Property Office on Mar. 28, 2022, the entire content of which is hereby incorporated by reference.

BACKGROUND

1. Field

Aspects of one or more embodiments of the present disclosure relate to a curable composition, a cured layer manufactured utilizing the composition, a color filter including the cured layer, and a display device including the color filter.

2. Description of the Related Art

In the embodiment of generally utilized/generally available quantum dots, due to surface characteristics having hydrophobicity, a solvent in which it is dispersed is limited, and thus, it is difficult to introduce (quantum dots) into a polar system such as a binder or a curable monomer.

For example, even in the embodiment of a quantum dot ink composition that was being actively researched, a polarity is relatively low in an initial step and it may be dispersed in a solvent utilized in a curable composition having a high hydrophobicity. Therefore, because 20 wt % or more of quantum dots are difficult to be included based on the total amount of the composition, it may be impossible to increase light efficiency of the ink over a certain level. Even though the quantum dots are additionally added and dispersed in order to increase light efficiency, a viscosity exceeds a range capable of ink-jetting and thus processability may not be satisfied (may not be suitable).

In order to achieve the viscosity range capable of ink-jetting, an attempt has been made to lower an ink solid content (e.g., amount) by dissolving 50 wt % or more of a solvent based on the total amount of the composition, which also provides a somewhat satisfactory (suitable) result in terms of viscosity. However, it may be considered to be a satisfactory (suitable) result in terms of a viscosity, but nozzle drying due to solvent volatilization and nozzle clogging during ink-jetting and reduction of a single film thickness as time passed after ink-jetting may become worse and it is difficult to control a thickness deviation after curing. Thus, it is difficult to apply it to an actual processes.

Therefore, a solvent-free type or kind quantum dot ink that does not include a solvent may be the most desirable form to be applied to an actual process. The current technique of applying a quantum dot itself to a solvent type or kind composition is now limited to a certain extent for at least the reasons discussed above.

In another application/use, the quantum dots are required to have several main (necessary) properties in applications to a quantum dot display, of which a most important property in terms of products is high luminance on the display and reliability of maintaining the luminance. The luminance may be highly likely expressed by property of quantum dot particles themselves, but the reliability is still facing significant barriers to overcome.

The reliability may be broadly classified into heat resistance and light resistance. Efforts have been made to improve the foregoing through one or more suitable approaches in the past many studies.

For example, techniques generally utilized/generally available include a method of encapsulating the quantum dots with an inorganic material such as aluminum, titanium, and/or oxides thereof and/or the like.

However, all of the foregoing methods are still being academically studied/researched but are still difficult to apply to actual display products.

SUMMARY

An aspect of one or more embodiments of the present disclosure is directed toward a curable composition including quantum dots having excellent or suitable heat-resistance reliability even after thermal curing.

Another aspect of one or more embodiments is directed toward a cured layer manufactured utilizing the curable composition.

Another aspect of one or more embodiments is directed toward a color filter including the cured layer.

Another aspect of one or more embodiments is directed toward a display device including the color filter.

Additional aspects will be set forth in part in the description which follows and, in part, will be apparent from the description, or may be learned by practice of the presented embodiments of the disclosure.

One or more embodiments of the present disclosure provide a curable composition including (A) a quantum dot surface-modified with a first ligand and a second ligand having a different structure; and (B) a polymerizable compound, wherein the first ligand is a silsesquioxane-based thiol ligand.

The silsesquioxane-based thiol ligand may be a cage-type or kind silsesquioxane-based thiol ligand (e.g., a cage-silsesquioxane-based thiol ligand).

The silsesquioxane-based thiol ligand may include a structural unit represented by Chemical Formula 1.

Chemical Formula 1

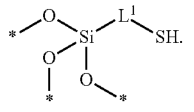

In Chemical Formula 1, $L^1$ may be an ether linking group, a sulfide linking group, a substituted or unsubstituted C1 to C20 alkylene group, a substituted or unsubstituted C3 to C20 cycloalkylene group, a substituted or unsubstituted C6 to C20 arylene group, or one or more combinations thereof.

The first ligand may be represented by Chemical Formula 1-1.

Chemical Formula 1-1

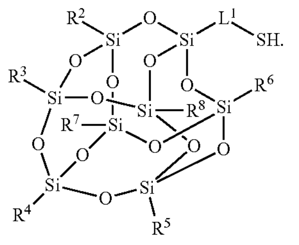

In Chemical Formula 1-1, $L^1$ may be an ether linking group, a sulfide linking group, a substituted or unsubstituted C1 to C20 alkylene group, a substituted or unsubstituted C3 to C20 cycloalkylene group, a substituted or unsubstituted C6 to C20 arylene group, or one or more combinations thereof, and $R^2$ to $R^8$ may each independently be a substituted or unsubstituted C1 to C20 alkyl group, a substituted or unsubstituted C3 to C20 cycloalkyl group, a substituted or unsubstituted C6 to C20 aryl group, or one or more combinations thereof.

A content (e.g., amount) of the first ligand on the surface of the quantum dot may be less than or equal to a content (e.g., amount) of the second ligand.

A weight ratio of the first ligand to the second ligand on the surface of the quantum dot may be about 1:9 to about 5:5.

The second ligand may be a thiol ligand having a structure different from that of the first ligand.

The second ligand may be represented by Chemical Formula 2.

Chemical Formula 2

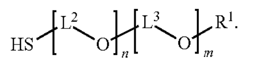

In Chemical Formula 2, $R^1$ may be a substituted or unsubstituted C1 to C20 alkyl group, a substituted or unsubstituted C3 to C20 cycloalkyl group, a substituted or unsubstituted C6 to C20 aryl group, or one or more combinations thereof, $L^2$ and $L^3$ may each independently be a substituted or unsubstituted C1 to C20 alkylene group, a substituted or unsubstituted C3 to C20 cycloalkylene group, a substituted or unsubstituted C6 to C20 arylene group, or one or more combinations thereof, and n and m may each independently be an integer from 0 to 100, provided that $n+m \neq 0$.

In Chemical Formula 2, $R^1$ may be a substituted or unsubstituted C6 to C20 aryl group.

In Chemical Formula 2, $R^1$ may be a substituted or unsubstituted C1 to C20 alkyl group and $L^2$ and $L^3$ may be the same.

In Chemical Formula 2, $R^1$ may be a substituted or unsubstituted C1 to C20 alkyl group and $L^2$ and $L^3$ may be different from each other.

The curable composition may be a solvent-free curable composition.

The solvent-free curable composition may include about 5 wt % to about 60 wt % of the quantum dots; and about 40 wt % to about 95 wt % of the polymerizable compound based on the total amount of the solvent-free curable composition.

The curable composition may further include a polymerization initiator, a light diffusing agent, a polymerization inhibitor, or one or more combinations thereof.

The light diffusing agent may include barium sulfate, calcium carbonate, titanium dioxide, zirconia, or one or more combinations thereof.

The curable composition may further include a solvent.

The curable composition may include about 1 wt % to about 40 wt % of the quantum dots; about 1 wt % to about 20 wt % of the polymerizable compound; and about 40 wt % to about 80 wt % of the solvent based on the total weight of the curable composition.

The curable composition may further include malonic acid; 3-amino-1,2-propanediol; a silane-based coupling agent; a leveling agent; a fluorine-based surfactant; or one or more combinations thereof.

Another embodiment provides a cured layer manufactured utilizing the curable composition.

Another embodiment provides a color filter including the cured layer.

Another embodiment provides a display device including the color filter.

Other embodiments of the present disclosure are included in the following detailed description.

The quantum dots may be surface-modified with a ligand of a composition not previously available in the quantum dot-containing curable composition, and thus heat-resistance reliability after thermal curing of the quantum dot-containing curable composition may be improved.

BRIEF DESCRIPTION OF THE DRAWINGS

The accompanying drawing is included to provide a further understanding of of the present disclosure, and is incorporated in and constitutes a part of this specification. The drawing illustrates example embodiments of the present disclosure and, together with the description, serves to explain principles of present disclosure. In the drawings:

The drawing is a view illustrating a quantum dot surface-modified with a first ligand and a second ligand.

DETAILED DESCRIPTION

The present disclosure may be modified in many alternate forms, and thus specific embodiments will be exemplified in the drawing and described in more detail. It should be understood, however, that it is not intended to limit the present disclosure to the particular forms disclosed, but rather, is intended to cover all modifications, equivalents, and alternatives falling within the spirit and scope of the present disclosure.

Hereinafter, embodiments of the present disclosure are described in more detail. However, these embodiments are merely examples, the present disclosure is not limited thereto and the present disclosure is defined by the scope of claims and equivalents thereof.

As utilized herein, when specific definition is not otherwise provided, "alkyl group" refers to a C1 to C20 alkyl group, "alkenyl group" refers to a C2 to C20 alkenyl group, "cycloalkenyl group" refers to a C3 to C20 cycloalkenyl group, "heterocycloalkenyl group" refers to a C3 to C20 heterocycloalkenyl group, "aryl group" refers to a C6 to C20 aryl group, "arylalkyl group" refers to a C6 to C20 arylalkyl group, "alkylene group" refers to a C1 to C20 alkylene group, "arylene group" refers to a C6 to C20 arylene group, "alkylarylene group" refers to a C6 to C20 alkylarylene group, "heteroarylene group" refers to a C3 to C20 heteroarylene group, and "alkoxylene group" refers to a C1 to C20 alkoxylene group.

As utilized herein, when a specific definition is not otherwise provided, "substituted" refers to replacement of at least one hydrogen atom by a substituent selected from a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or one or more combinations thereof.

As utilized herein, when a specific definition is not otherwise provided, "hetero" refers to inclusion of at least one heteroatom selected from among N, O, S, and P, in the chemical formula.

As utilized herein, when a specific definition is not otherwise provided, "(meth)acrylate" refers to both (e.g., simultaneously) "acrylate" and "methacrylate," and "(meth) acrylic acid" refers to "acrylic acid" and "methacrylic acid."

As utilized herein, when a specific definition is not otherwise provided, the term "combination" refers to mixing or copolymerization.

In the present disclosure, when a definition is not otherwise provided, hydrogen is bonded at the position when a chemical bond is not drawn in chemical formula where hydrogen is supposed to be provided.

In some embodiments, in the present disclosure, when a definition is not otherwise provided, "*" refers to a linking point with the same or different atom or chemical formula.

The quantum dot-containing curable composition according to the present disclosure uses two or more types (kinds) of ligands to modify the surface of the quantum dots, and by limiting the structure of the ligands and the weight ratio of the two or more ligands, it is possible to achieve excellent or suitable heat-resistance reliability after thermal curing.

For example, the present disclosure is primarily directed to improving heat-resistance reliability by passivating the surface of the quantum dots with a thiol ligand containing a silsesquioxane component at a set or predetermined ratio to locally cover a defect site or a dangling bond of the quantum dots. Because a generally utilized/generally available silicon or siloxane component, when actually applied, has been already been recognized to sharply deteriorate dispersibility of the quantum dots and thus impair compatibility with a curable composition, the inventors have reiterated that when a generally utilized/generally available thiol ligand is applied for the surface modification of the quantum dots along with a siloxane ligand such as 3-mercapto propyl trimethoxysilane and/or the like, dispersibility of the quantum dots may not be secured under any conditions.

However, the inventors have confirmed that when the thiol ligand including the silsesquioxane component, which is a silsesquioxane-based thiol ligand (first ligand) with a second ligand having a different structure from that of the first ligand is applied for the surface-modification of the quantum dots, the silsesquioxane structure of the first ligand may form an affinity with the surface of the quantum dots in the form of bulky siloxane cages in a large amount and ultimately, thus greatly improve compatibility with the curable composition, thereby the present invention through repeating related studies should be completed, realized, and/or reduced to practice.

Hereinafter, each component constituting the curable composition according to an embodiment will be described in more detail.

Quantum Dots

The quantum dots in the curable composition according to an embodiment may be surface-modified with at least two or more ligands, wherein the ligand includes a silsesquioxane-based thiol ligand (first ligand) and a second ligand having a structure different from that of the first ligand.

As aforementioned, when the first ligand 1 and the second ligand 2 are utilized to concurrently (e.g., simultaneously) surface-modify the quantum dot 3, the surface-modified quantum dots may be easily prepared/formed into a highly densified or highly concentrated quantum dot dispersion (improving dispersibility of the quantum dots with respect to a polymerizable monomer, which is described in more detail below) and thus have significant effects on improving low viscosity and heat resistance and for example, realizing a solvent-free curable composition.

For example, the silsesquioxane-based thiol ligand may be a cage-type or kind silsesquioxane-based thiol ligand. Silsesquioxane may have one or more suitable structures such as cage type or kind, random type or kind, ladder type or kind, and/or the like, wherein the cage-type or kind structure results in almost no generation of volatile components during the thermal curing and exhibits excellent or suitable heat resistance due to low equivalents of a functional group and accordingly, may advantageously maximize or increase affinity for the surface of the quantum dots. (For example, the random type or kind structure has high (a large number of) equivalents of the functional groups and generates impurities during the thermal curing, and the ladder type or kind structure exhibits properties close to silicon during the thermal curing and thus may be inappropriate for the quantum dot-containing curable composition.)

For example, the silsesquioxane-based thiol ligand may include a structural unit represented by Chemical Formula 1, but is not limited thereto.

Chemical Formula 1

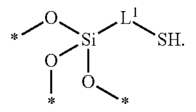

In Chemical Formula 1, $L^1$ may be an ether linking group, a sulfide linking group, a substituted or unsubstituted C1 to C20 alkylene group, a substituted or unsubstituted C3 to C20 cycloalkylene group, a substituted or unsubstituted C6 to C20 arylene group, or one or more combinations thereof.

For example, the first ligand may be represented by Chemical Formula 1-1, but is not limited thereto.

Chemical Formula 1-1

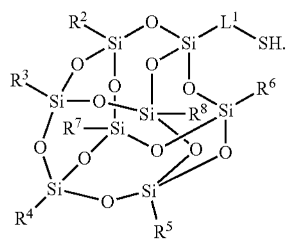

In Chemical Formula 1-1, $L^1$ may be an ether linking group (*—O—*), a sulfide linking group (*—S—*), a substituted or unsubstituted C1 to C20 alkylene group, a substituted or unsubstituted C3 to C20 cycloalkylene group, a substituted or unsubstituted C6 to C20 arylene group, or one or more combinations thereof, and $R^2$ to $R^8$ may each independently be a substituted or unsubstituted C1 to C20 alkyl group, a substituted or unsubstituted C3 to C20 cycloalkyl group, a substituted or unsubstituted C6 to C20 aryl group, or one or more combinations thereof.

For example, in Chemical Formula 1-1, $R^2$ to $R^8$ may each independently include an alkyl substituent at the terminal end thereof. For example, in Chemical Formula 1-1, $R^2$ to $R^8$ may each independently be a C1 to C20 alkyl group including a C1 to C10 alkyl substituent at the terminal end thereof. For example, in Chemical Formula 1-1, $R^2$ to $R^8$ may each independently be a C1 to C20 alkyl group including an isopropyl group or a tert-butyl group at the terminal end thereof. In Chemical Formula 1-1, $R^2$ to $R^8$ may each further include an alkyl substituent at the terminal end, so that a bulky amount of siloxane cage form may be implemented, and thus, the affinity for the surface of the quantum dots in the curable composition may be maximized or increased.

For example, a content (e.g., amount) of the first ligand on the surface of the quantum dot may be less than or equal to a content (e.g., amount) of the second ligand. For example, the first ligand and the second ligand on the surface of the quantum dot may be included in a weight ratio of about 1:9 to about 5:5. When the content (e.g., amount) of the first ligand is greater than the content (e.g., amount) of the second ligand, the viscosity of the quantum dot-containing curable composition may increase, which may be undesirable in terms of ink-jetting properties.

For example, the second ligand may be a thiol ligand having a structure different from that of the first ligand.

For example, the second ligand may be represented by Chemical Formula 2, but is not limited thereto.

Chemical Formula 2

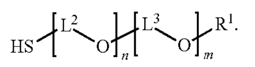

In Chemical Formula 2, $R^1$ may be a substituted or unsubstituted C1 to C20 alkyl group, a substituted or unsubstituted C3 to C20 cycloalkyl group, a substituted or unsubstituted C6 to C20 aryl group, or one or more combinations thereof, $L^2$ and $L^3$ may each independently be a substituted or unsubstituted C1 to C20 alkylene group, a substituted or unsubstituted C3 to C20 cycloalkylene group, a substituted or unsubstituted C6 to C20 arylene group, or one or more combinations thereof, and n and m may each independently be an integer from 0 to 100, provided that $n+m\neq0$.

For example, in Chemical Formula 2, $R^1$ may be a substituted or unsubstituted C6 to C20 aryl group. In this embodiment, the heat-resistance reliability of the curable composition according to the embodiment may be maximized or increased.

For example, in Chemical Formula 2, $R^1$ may be a substituted or unsubstituted C1 to C20 alkyl group, and $L^2$ and $L^3$ may be the same. In this embodiment, the viscosity of the curable composition may be lowered without reducing the heat-resistance reliability of the curable composition according to the embodiment.

For example, in Chemical Formula 2, $R^1$ may be a substituted or unsubstituted C1 to C20 alkyl group, and $L^2$ and $L^3$ may be different from each other. In this embodiment, the viscosity of the curable composition may be greatly reduced without reducing the heat-resistance reliability of the curable composition according to the embodiment.

For example, the quantum dots may have a maximum fluorescence emission wavelength in the range of about 500 nm to about 680 nm.

For example, when the curable composition according to an embodiment is a solvent-free curable composition, the quantum dots may be included in an amount of about 5 wt % to about 60 wt %, for example about 10 wt % to about 60 wt %, for example about 20 wt % to about 60 wt %, for example about 30 wt % to about 50 wt %. When the quantum dots are included within the above range, high light retention and light efficiency even after curing may be achieved.

For example, when the curable composition according to an embodiment is a curable composition including a solvent, the quantum dots may be included in an amount of about 1 wt % to about 40 wt %, for example about 3 wt % to about 30 wt %, based on the total amount of the curable composition. When the quantum dots are included within the above range, the light conversion rate is improved and the pattern characteristics and the developing characteristics are not impaired, and thus excellent or suitable processability may be obtained.

Curable compositions (inks) including quantum dots to date have been developed to specialize in thiol-based binders or monomers with good or suitable compatibility with quantum dots, and furthermore, they are being commercialized.

For example, the quantum dots may absorb light in a wavelength region of about 360 nm to about 780 nm, for example about 400 nm to about 780 nm and may emit fluorescence in a wavelength region of about 500 nm to about 700 nm, for example about 500 nm to about 580 nm, or emits fluorescence in a wavelength region of about 600 nm to about 680 nm. For example, the quantum dots may have a maximum fluorescence emission wavelength (fluorescence $\lambda_{em}$) at about 500 nm to about 680 nm.

The quantum dots may independently have a full width at half maximum (FWHM) of about 20 nm to about 100 nm, for example about 20 nm to about 50 nm. When the quantum dots have a full width at half maximum (FWHM) of these ranges, color reproducibility is increased when utilized as a color material in a color filter due to high color purity.

The quantum dots may independently be an organic material, an inorganic material, or a hybrid (mixture) of an organic material and an inorganic material.

The quantum dots may independently be composed of a core and a shell around (e.g., surrounding) the core, and the core and the shell may independently have a structure of a core, a core/shell, a core/first shell/second shell, an alloy, an alloy/shell, and/or the like, which is composed of Group II-IV, Group III-V, and/or the like, but are not limited thereto.

For example, the core may include at least at least one material selected from CdS, CdSe, CdTe, ZnS, ZnSe, ZnTe, HgS, HgSe, HgTe, GaN, GaP, GaAs, InP, InAs, and an alloy thereof, but is not limited thereto. The shell around (e.g., surrounding) the core may include at least at least one material selected from among CdSe, ZnSe, ZnS, ZnTe, CdTe, PbS, TiO, SrSe, HgSe, and an alloy thereof, but is not limited thereto.

In an embodiment, because an interest in an environment has been recently much increased over the whole world, and a restriction of a toxic material also has been fortified, a cadmium-free light emitting material (InP/ZnS, InP/ZnSe/ZnS, etc.) having little low quantum efficiency (quantum yield) but being environmentally-friendly instead of a light emitting material having a cadmium-based core is utilized, but not limited thereto.

In the embodiment of the quantum dots of the core/shell structure, an entire size including the shell (an average particle diameter) may be about 1 nm to about 15 nm, for example, about 5 nm to about 15 nm.

For example, the quantum dots may independently include red quantum dots, green quantum dots, or a combination thereof. The red quantum dots may independently have an average particle diameter of about 10 nm to about 15 nm. The green quantum dots may independently have an average particle diameter of about 5 nm to about 8 nm.

In an embodiment, for the dispersion stability of the quantum dots, the curable composition according to an embodiment may further include a dispersant. The dispersant helps substantially uniform dispersibility of light conversion materials such as quantum dots in the curable composition and may include a non-ionic, anionic, or cationic dispersant. For example, the dispersant may be polyalkylene glycol or esters thereof, a polyoxy alkylene, a polyhydric alcohol ester alkylene oxide addition product, an alcohol alkylene oxide addition product, a sulfonate ester, a sulfonate salt, a carboxylate ester, a carboxylate salt, an alkyl amide alkylene oxide addition product, an alkyl amine and/or the like, and they may be utilized alone or in a mixture of two or more. The dispersant may be utilized in an amount of about 0.1 wt % to about 100 wt %, for example about 10 wt % to about 20 wt % based on the solid content (e.g., amount) of the light conversion material such as quantum dots.

Polymerizable Compound

The curable composition according to an embodiment includes a polymerizable compound, and the polymerizable compound may have a carbon-carbon double bond at the terminal end thereof.

The polymerizable compound having the carbon-carbon double bond at the terminal end may be included in an amount of about 40 wt % to about 95 wt %, for example about 50 wt % to about 90 wt %, based on the total amount of the solvent-free curable composition. When the content (e.g., amount) of the polymerizable compound having the carbon-carbon double bond at the terminal end is within the above range, a solvent-free curable composition having a viscosity capable of ink-jetting may be prepared, and quantum dots in the prepared solvent-free curable composition may have improved dispersibility and optical properties.

For example, the polymerizable compound having the carbon-carbon double bond at the terminal end may have a molecular weight of about 170 g/mol to about 1,000 g/mol. When the molecular weight of the polymerizable compound having the carbon-carbon double bond at the terminal end is within the above range, it may be advantageous for ink-jetting because the viscosity of the composition is not increased without inhibiting the optical properties of the quantum dots.

For example, the polymerizable compound having the carbon-carbon double bond at the terminal end may be represented by Chemical Formula 3, but is not limited thereto.

Chemical Formula 3

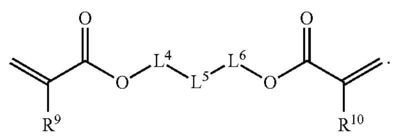

In Chemical Formula 3, $R^9$ and $R^{10}$ may each independently be a hydrogen atom or a substituted or unsubstituted C1 to C10 alkyl group, $L^4$ and $L^6$ may each independently be a single bond or a substituted or unsubstituted C1 to C10 alkylene group, and $L^5$ may be a substituted or unsubstituted C1 to C10 alkylene group, a substituted or unsubstituted C3 to C20 cycloalkylene group, or an ether linking group (*—O—*).

For example, the polymerizable compound having a carbon-carbon double bond at the terminal end may be represented by Chemical Formula 3-1 or 3-2, but is not limited thereto.

Chemical Formula 3-1

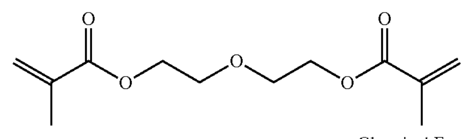

Chemical Formula 3-2

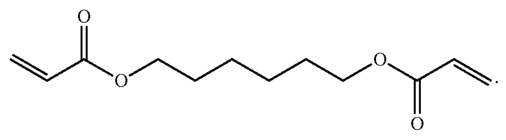

For example, the polymerizable compound having the carbon-carbon double bond at the terminal end may further include ethylene glycoldiacrylate, triethylene glycol diacrylate, 1,4-butanediol diacrylate, 1,6-hexanediol diacrylate, neopentylglycol diacrylate, pentaerythritol diacrylate, pentaerythritol triacrylate, dipentaerythritol diacrylate, dipentaerythritol triacrylate, dipentaerythritol pentaacrylate, pentaerythritol hexaacrylate, bisphenol A diacrylate, trimethylolpropanetriacrylate, novolac epoxy acrylate, ethylene glycol dimethacrylate, triethylene glycol dimethacrylate, propylene glycol dimethacrylate, 1,4-butanediol dimethacrylate, 1,6-hexanediol dimethacrylate, or one or more combinations thereof, in addition to the compound represented by Chemical Formula 3-1 or 3-2.

In some embodiments, the polymerizable compound having the carbon-carbon double bond at the terminal end may further include a monomer generally utilized in thermosetting or photocurable compositions, and for example, the monomer may further include an oxetane-based compound such as bis[1-ethyl (3-oxetanyl)]methyl ether.

In some embodiments, when the curable composition includes a solvent, the polymerizable compound may be included in an amount of about 1 wt % to about 20 wt %, about 1 wt % to about 15 wt %, for example about 5 wt % to about 15 wt %, based on the total amount of the curable composition. When the polymerizable compound is included within the above range, optical properties of the quantum dots may be improved.

Light Diffusing Agent

The curable composition according to an embodiment may further include a light diffusing agent.

For example, the light diffusing agent may include barium sulfate ($BaSO_4$), calcium carbonate ($CaCO_3$), titanium dioxide ($TiO_2$), zirconia ($ZrO_2$), or one or more combinations thereof.

The light diffusing agent may reflect unabsorbed light in the aforementioned quantum dots and allows the quantum dots to absorb the reflected light again. For example, the light diffusing agent may increase an amount of light absorbed by the quantum dots and increase light conversion efficiency of the curable composition.

The light diffusing agent may have an average particle diameter ($D_{50}$) of about 150 nm to about 250 nm, or about 180 nm to about 230 nm. When the average particle diameter of the light diffusing agent is within these ranges, it may have a better light diffusing effect and increase light conversion efficiency.

The light diffusing agent may be included in an amount of about 1 wt % to about 20 wt %, for example about 2 wt % to about 15 wt %, for example about 3 wt % to about 10 wt %, based on the total amount of the curable composition. When the light-diffusing agent is included in an amount of less than 1 wt % based on the total amount of the curable composition, it is difficult to expect an effect of improving light conversion efficiency by utilizing the light-diffusing agent, and when it is included in an amount of greater than 20 wt %, quantum dot sedimentation may occur.

Polymerization Initiator

The curable composition according to the embodiment may further include a polymerization initiator, for example, a photopolymerization initiator, a thermal polymerization initiator, or one or more combinations thereof.

The photopolymerization initiator is a generally utilized/generallyavailable initiator for a photosensitive resin composition, for example an acetophenone-based compound, a benzophenone-based compound, a thioxanthone-based compound, a benzoin-based compound, a triazine-based compound, an oxime-based compound, an aminoketone-based compound, and/or the like, but is not limited thereto.

Examples of the acetophenone-based compound may be 2,2'-diethoxy acetophenone, 2,2'-dibutoxy acetophenone, 2-hydroxy-2-methylpropinophenone, p-t-butyltrichloroacetophenone, p-t-butyldichloroacetophenone, 4-chloroacetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and/or the like.

Examples of the benzophenone-based compound may be benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylamino-benzophenone, 4,4'-dichlorobenzophenone, 3,3'-dimethyl-2-methoxybenzophenone, and/or the like.

Examples of the thioxanthone-based compound may be thioxanthone, 2-methylthioxanthone, isopropyl thioxanthone, 2,4-diethyl thioxanthone, 2,4-diisopropyl thioxanthone, 2-chlorothioxanthone, and/or the like.

Examples of the benzoin-based compound may be benzoin, benzoin methyl ether, benzoin ethyl ether, benzoin isopropyl ether, benzoin isobutyl ether, benzyldimethylketal, and/or the like.

Examples of the triazine-based compound may be 2,4,6-trichloro-s-triazine, 2-phenyl-4,6-bis(trichloromethyl)-s-triazine, 2-(3',4'-dimethoxystyryl)-4,6 -bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloromethyl)-s-triazine, bis(trichloromethyl)-6-styryl-s-triazine, 2-(naphtho1-yl)-4,6-bis(trichloromethyl)-s-triazine, 2-(4-methoxynaphtho1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and/or the like.

Examples of the oxime-based compound may be O-acyloxime-based compound, 2-(O-benzoyloxime)-1-[4-(phenylthio)phenyl]-1,2-octandione, 1-(0-acetyloxime)-1-[9-ethyl-6-(2-methylbenzoyl)-9H-carbazol-3-yl]ethanone, 0-ethoxycarbonyl-α-oxyamino-1-phenylpropan-1-one, and/or the like. Examples of the O-acyloxime-based compound may be 1,2-octandione, 2-dimethylamino-2-(4-methylbenzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and/or the like.

Examples of the aminoketone-based compound may be 2-benzyl-2-dimethylamino-1-(4-morpholinophenyl)-butanone-1, and/or the like.

The photopolymerization initiator may further include a carbazole-based compound, a diketone-based compound, a sulfonium borate-based compound, a diazo-based compound, an imidazole-based compound, a biimidazole-based compound, and/or the like.

The photopolymerization initiator may be utilized with a photosensitizer capable of causing a chemical reaction by absorbing light and becoming excited and then, transferring its energy.

Examples of the photosensitizer may be tetraethylene glycol bis-3-mercapto propionate, pentaerythritol tetrakis-3-mercapto propionate, dipentaerythritol tetrakis-3-mercapto propionate, and/or the like.

Examples of the thermal polymerization initiator may be peroxide, specifically benzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, cumene hydroperoxide), dicyclohexyl peroxydicarbonate, 2,2-azobis(isobutyronitrile), t-butyl perbenzoate, and/or the like, for example 2,2'-azobis-2-methylpropinonitrile, but are not limited thereto, and any of which is generally utilized/generally available in the art may be utilized.

The polymerization initiator may be included in an amount of about 0.1 wt % to about 5 wt %, for example about 1 wt % to about 4 wt % based on the total amount of the curable composition. When the polymerization initiator is included in these ranges, it is possible to obtain excellent or suitable reliability due to sufficient curing during exposure or thermal curing and to prevent or reduce deterioration of transmittance due to non-reaction initiators, thereby preventing or reducing deterioration of optical properties of the quantum dots.

Binder Resin

The curable composition according to an embodiment may further include a binder resin.

The binder resin may include an acrylic resin, a cardo-based resin, an epoxy resin, or one or more combinations thereof.

The acrylic resin may be a copolymer of a first ethylenic unsaturated monomer and a second ethylenic unsaturated monomer that is copolymerizable therewith, and may be a resin including at least one acrylic repeating unit.

Examples of the acrylic binder resin may be polybenzylmethacrylate, a (meth)acrylic acid/benzylmethacrylate copolymer, a (meth)acrylic acid/benzylmethacrylate/styrene copolymer, a (meth)acrylic acid/benzylmethacrylate/2-hydroxyethylmethacrylate copolymer, a (meth)acrylic acid/benzylmethacrylate/styrene/2-hydroxyethylmethacrylate copolymer, and/or the like, but are not limited thereto, and may be utilized alone or as a mixture of two or more.

A weight average molecular weight of the acrylic binder resin may be about 5,000 g/mol to about 15,000 g/mol. When the acrylic binder resin has a weight average molecular weight within this range, close-contacting properties to a substrate, physical and chemical properties are improved, and a viscosity is appropriate or suitable.

The acrylic resin may have an acid value of about 80 mgKOH/g to about 130 mgKOH/g. When the acrylic resin has an acid value within this range, a pixel pattern may have excellent or suitable resolution.

The cardo-based resin may be utilized in a curable resin (or photosensitive resin) composition, and may be, for example, utilized as disclosed in Korean Patent Application Laid-Open No. 10-2018-0067243 (the entire content of which is hereby incorporated by reference), but is not limited thereto.

The cardo-based resin may be, for example prepared by mixing at least two of a fluorene-containing compound such as 9,9-bis(4-oxiranylmethoxyphenyl)fluorene; an anhydride compound such as benzenetetracarboxylic acid dianhydride, naphthalenetetracarboxylic acid dianhydride, biphenyltetracarboxylic acid dianhydride, benzophenonetetracarboxylic acid dianhydride, pyromellitic dianhydride, cyclobutanetetracarboxylic acid dianhydride, perylenetetracarboxylic acid dianhydride, tetrahydrofurantetracarboxylic acid dianhydride, and/or tetrahydrophthalic anhydride; a glycol compound such as ethylene glycol, propylene glycol, and/or polyethylene glycol; an alcohol compound such as methanol, ethanol, propanol, n-butanol, cyclohexanol, and/or benzylalcohol; a solvent-based compound such as propylene glycol methylethylacetate, and/or N-methylpyrrolidone; a phosphorus compound such as triphenylphosphine; and/or an amine or ammonium salt compound such as tetramethylammonium chloride, tetraethylammonium bromide, benzyldiethylamine, triethylamine, tributylamine, and/or benzyltriethylammonium chloride.

A weight average molecular weight of the cardo-based binder resin may be about 500 g/mol to about 50,000 g/mol, for example about 1,000 g/mol to about 30,000 g/mol. When the weight average molecular weight of the cardo-based binder resin is within these ranges, a satisfactory (suitable) pattern may be formed without a residue during a production of a cured layer and without losing a film thickness during development of the solvent type or kind curable composition.

When the binder resin is a cardo-based resin, the developability of the curable composition, for example the photosensitive resin composition, including the binder resin is improved, and the sensitivity during photocuring is good or suitable, so that the fine pattern formation property is improved.

The epoxy resin may be a monomer or oligomer that is capable of being polymerized by heat, and may include a compound having a carbon-carbon unsaturated bond and a carbon-carbon cyclic bond.

The epoxy resin may include, but is not limited to, a bisphenol A-type or kind epoxy resin, a bisphenol F-type or kind epoxy resin, a phenol novolac-type or kind epoxy resin, a cyclic aliphatic epoxy resin, and an aliphatic polyglycidyl ether.

Currently available products thereof may include bisphenyl epoxy resins such as YX4000, YX4000H, YL6121H, YL6640, or YL6677 from Yuka Shell Epoxy Co., Ltd.; cresol novolac-type or kind epoxy resins such as EOCN-102, EOCN-103S, EOCN-104S, EOCN-1020, EOCN-1025, and/or EOCN-1027 from Nippon Kayaku Co., Ltd. and/or EPIKOTE 180S75 from Yuka Shell Epoxy Co., Ltd.; bisphenol A epoxy resins such as EPIKOTE 1001, 1002, 1003, 1004, 1007, 1009, 1010, and/or 828 from Yuka Shell Epoxy Co., Ltd.; bisphenol F-type or kind epoxy resins such as EPIKOTE 807 and/or 834 from Yuka Shell Epoxy Co., Ltd.; phenol novolac-type or kind epoxy resins such as EPIKOTE 152, 154, and/or 157H65 from Yuka Shell Epoxy Co., Ltd. and/or EPPN 201, 202 from Nippon Kayaku Co., Ltd.; other cyclic aliphatic epoxy resins such as CY175, CY177 and/or CY179 from CIBA-GEIGY A.G, ERL-4234, ERL-4299, ERL-4221, and/or ERL-4206 from U.C.C, Shodyne 509 from Showa Denko K.K., ARALDITE CY-182, CY-192 and/or CY-184 from CIBA-GEIGY A.G, Epichron 200 and/or 400 from Dainippon Ink and/or Chemicals, Inc., EPIKOTE 871, 872 and/or EP1032H60 from Yuka Shell Epoxy Co., Ltd., ED-5661 and/or ED-5662 from Celanese Coatings Co., Ltd.; aliphatic polyglycidylethers such as EPIKOTE 190P and/or 191P from Yuka Shell Epoxy Co., Ltd., Epolite 100MF from Kyoesha Yushi Co., Ltd., Epiol TMP from Nippon Yushi Co., Ltd., and/or the like.

For example, when the curable composition according to an embodiment is a solvent-free curable composition, the binder resin may be included in an amount of about 0.5 wt % to about 10 wt %, for example about 1 wt % to about 5 wt %, based on the total amount of the curable composition. In this embodiment, heat resistance and chemical resistance of the solvent-free curable composition may be improved, and storage stability of the composition may also be improved.

For example, when the curable composition according to an embodiment is a curable composition including a solvent, the binder resin may be included in an amount of about 1 wt % to about 30 wt %, for example about 3 wt % to about 20 wt %, based on the total amount of the curable composition. In this embodiment, pattern characteristics, heat resistance and chemical resistance may be improved.

Other Additives

For stability and dispersion improvement of the quantum dot, the curable composition according to an embodiment may further include a polymerization inhibitor.

The polymerization inhibitor may include a hydroquinone-based compound, a catechol-based compound, or a combination thereof, but is not limited thereto. When the curable composition according to an embodiment further includes the hydroquinone-based compound, the catechol-based compound, or the combination thereof, room temperature cross-linking during exposure after printing (coating) the curable composition may be prevented or reduced.

For example, the hydroquinone-based compound, catechol-based compound or combination thereof may include hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O,O')aluminium, or one or more combinations thereof, but is not limited thereto.

The hydroquinone-based compound, catechol-based compound, or combination thereof may be utilized in the form of a dispersion, and the polymerization inhibitor in the dispersion form may be included in an amount of about 0.001 wt % to about 3 wt %, for example about 0.01 wt % to about 2 wt % based on the total amount of the curable composition. When the polymerization inhibitor is included within the above ranges, the problem of aging at room temperature may be solved, and at the same time (concurrently), reduction of sensitivity and surface peeling may be prevented or reduced.

In some embodiments, the curable composition according to an embodiment may further include malonic acid; 3-amino-1,2-propanediol; a silane-based coupling agent; a leveling agent; a fluorine-based surfactant; or one or more combinations thereof in order to improve heat resistance and reliability.

For example, the curable composition according to an embodiment may further include a silane-based coupling agent having a reactive substituent such as a vinyl group, a carboxyl group, a methacryloxy group, an isocyanate group, an epoxy group, and/or the like in order to improve close-contacting properties with a substrate.

Examples of the silane-based coupling agent may be trimethoxysilyl benzoic acid, γ-methacryl oxypropyl trimethoxysilane, vinyl triacetoxysilane, vinyl trimethoxysilane, γ-isocyanate propyl triethoxy silane, γ-glycidoxy propyl trimethoxysilane, β-epoxycyclohexyl)ethyl trimethoxy silane, and/or the like, and these may be utilized alone or in a mixture of two or more.

The silane-based coupling agent may be included in an amount of 0.01 parts by weight to 10 parts by weight based on 100 parts by weight of the curable composition. When the silane-based coupling agent is included within this range, close-contacting properties, storage capability, and/or the like may be improved.

In some embodiments, the curable composition may further include a surfactant, for example a fluorine-based surfactant as needed in order to improve coating properties and inhibit generation of spots, for example, improve leveling performance.

The fluorine-based surfactant may have a low weight average molecular weight of about 4,000 g/mol to about 10,000 g/mol, or about 6,000 g/mol to about 10,000 g/mol. In some embodiments, the fluorine-based surfactant may have a surface tension of about 18 mN/m to about 23 mN/m (measured in 0.1% polyethylene glycol monomethylether acetate (PGMEA) solution). When the fluorine-based surfactant has a weight average molecular weight and a surface tension within these ranges, leveling performance may be further improved, and excellent or suitable characteristics may be provided when slit coating as high-speed coating is applied because film defects may be less generated by preventing or reducing a spot generation during the high-speed coating and suppressing a vapor generation.

Examples of the fluorine-based surfactant may be, BM-1000®, and/or BM-1100® (BM Chemie Inc.); MEGAFACE F 142D®, F 172®, F 173®, and/or F 183® Dainippon Ink Kagaku Kogyo Co., Ltd.); FULORAD FC-135®, FULORAD FC-170C®, FULORAD FC-430®, and/or FULORAD FC-431® (Sumitomo 3M Co., Ltd.); SURFLON S-112®, SURFLON S-113®, SURFLON S-131®, SURFLON S-141®, and/or SURFLON S-145® (ASAHI Glass Co., Ltd.); and SH-28PA®, SH-190®, SH-193®, SZ-6032®, and/or SF-8428®, and/or the like (Toray Silicone Co., Ltd.); F-482, F-484, F-478, F-554 and/or the like from DIC Co., Ltd.

In some embodiments, the solvent-free curable composition may include a silicone-based surfactant in addition to the fluorine-based surfactant. Examples of the silicone-based surfactant may be TSF400, TSF401, TSF410, TSF4440, and/or the like of Toshiba Silicone Co., Ltd., but are not limited thereto.

The surfactant may be included in an amount of about 0.01 parts by weight to about 5 parts by weight, for example about 0.1 parts by weight to about 2 parts by weight based on 100 parts by weight of the curable composition. When the surfactant is included within these ranges, foreign materials are produced less in a sprayed composition.

In some embodiments, the curable composition may further include other additives such as an antioxidant, a stabilizer, and/or the like in a set or predetermined amount, unless properties are deteriorated.

Solvent

The curable composition according to an embodiment may further include a solvent.

The solvent may for example include alcohols such as methanol, ethanol, and/or the like; glycol ethers such as ethylene glycol methylether, ethylene glycol ethylether, propylene glycol methylether, and/or the like; cellosolve acetates such as methyl cellosolve acetate, ethyl cellosolve acetate, diethyl cellosolve acetate, and/or the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and/or the like; propylene glycol alkylether acetates such as propylene glycol monomethylether acetate, propylene glycol propylether acetate, and/or the like; ketones such as methylethylketone, cyclohexanone, 4-hydroxy-4-methyl-2-pentanone, methyl-n-propylketone, methyl-n-butylketone, methyl-n-amylketone, 2-heptanone, and/or the like; saturated aliphatic monocarboxylic acid alkyl esters such as ethyl acetate, n-butyl acetate, isobutyl acetate, and/or the like; lactate esters such as methyl lactate, ethyl lactate, and/or the like; hydroxy acetic acid alkyl esters such as methyl hydroxyacetate, ethyl hydroxyacetate, butyl hydroxyacetate, and/or the like; acetic acid alkoxyalkyl esters such as methoxymethyl acetate, methoxyethyl acetate, methoxybutyl acetate, ethoxymethyl acetate, ethoxyethyl acetate, and/or the like; 3-hydroxypropionic acid alkyl esters such as methyl 3-hydroxypropionate, ethyl 3-hydroxypropionate, and/or the like; 3-alkoxypropionic acid alkyl esters such as methyl 3-methoxypropionate, ethyl 3-methoxypropionate, ethyl 3-ethoxypropionate, methyl 3-ethoxypropionate, and/or the like; 2-hydroxypropionic acid alkyl ester such as methyl 2-hydroxypropionate, ethyl 2-hydroxypropionate, propyl 2-hydroxypropionate, and/or the like; 2-alkoxypropionic acid alkyl esters such as methyl 2-methoxypropionate, ethyl 2-methoxypropionate, ethyl 2-ethoxypropionate, methyl 2-ethoxypropionate, and/or the like; 2-hydroxy-2-methylpropionic acid alkyl esters such as methyl 2-hydroxy-2-methylpropionate, ethyl 2-hydroxy-2-methylpropionate, and/or the like; 2-alkoxy-2-methylpropionic acid alkyl esters such as methyl 2-methoxy-2-methylpropionate, ethyl 2-ethoxy-2-methylpropionate, and/or the like; esters such as 2-hydroxyethyl propionate, 2-hydroxy-2-methylethyl propionate, hydroxyethyl acetate, methyl 2-hydroxy-3-methylbutanoate, and/or the like; or ketonate esters such as ethyl pyruvate, and/or the like, and in addition, may be N-methylformamide, N,N-dimethyl formamide, N-methylformanilide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzyl alcohol, benzyl acetate, ethyl benzoate, diethyl oxalate, diethyl maleate, α-butyrolactone, ethylene carbonate, propylene carbonate, phenyl cellosolve acetate, and/or the like, but is not limited thereto.

For example, the solvent may be glycol ethers such as ethylene glycol monoethylether, ethylene diglycolmethylethylether, and/or the like; ethylene glycol alkylether acetates such as ethyl cellosolve acetate, and/or the like; esters such as 2-hydroxy ethyl propionate, and/or the like; carbitols such as diethylene glycol monomethylether, and/or the like; propylene glycol alkylether acetates such as propylene glycol monomethylether acetate, propylene glycol propylether acetate, and/or the like; alcohols such as ethanol, and/or the like, or one or more combinations thereof.

For example, the solvent may be a polar solvent including propylene glycol monomethylether acetate, dipropylene glycol methylether acetate, ethanol, ethylene glycoldimethylether, ethylenediglycolmethylethylether, diethylene glycoldimethylether, 2-butoxyethanol, N-methylpyrrolidine, N-ethylpyrrolidine, propylene carbonate, α-butyrolactone, or one or more combinations thereof.

The solvent may be included in an amount of about 40 wt % to about 80 wt %, for example about 45 wt % to about 80 wt % based on the total amount of the curable composition. When the solvent is within these ranges, the solvent type or kind curable composition has appropriate or suitable viscosity and thus may have an excellent or suitable coating property when coated in a large area through spin-coating and slit-coating.

Other embodiments provide a cured layer manufactured utilizing the aforementioned curable composition, a color filter including the cured layer, and a display device including the color filter.

One of methods of manufacturing the cured layer may include coating the curable composition on a substrate utilizing an ink-jet spraying method to form a pattern (S1); and curing the pattern (S2).

(S1) Formation of Pattern

The curable composition may be coated to be 0.5 μm to 20 μm on a substrate in an ink-jet spraying method. The ink-jet spraying method may form a pattern by spraying a single color per each nozzle and thus repeating the spraying as many times as the needed number of colors, but the pattern may be formed by concurrently (e.g., simultaneously) spraying the needed number of colors through each ink-jet nozzle in order to reduce processes.

(S2) Curing

The obtained pattern is cured to obtain a pixel. Herein, the curing method may be thermal curing or photocuring process. The thermal curing process may be performed at greater than or equal to about 100° C., for example, in a range of about 100° C. to about 300° C., and for example, in a range of about 160° C. to about 250° C. The photocuring process may include irradiating an actinic ray such as a UV ray of about 190 nm to about 450 nm, for example about 200 nm to about 400 nm. The irradiating is performed by utilizing a light source such as a mercury lamp with a low pressure, a high pressure, or an ultrahigh pressure, a metal halide lamp, an argon gas laser, and/or the like. An X ray, an electron beam, and/or the like may be also utilized as needed.

Another method of manufacturing the cured layer may include manufacturing a cured layer utilizing the aforementioned curable composition by a lithographic method as follows.

(1) Coating and Film Formation

The curable composition is coated to have a desired or suitable thickness, for example, a thickness in a range of about 2 μm to about 10 μm, on a substrate which undergoes a set or predetermined pretreatment, utilizing a spin or slit coating method, a roll coating method, a screen-printing method, an applicator method, and/or the like. Then, the coated substrate is heated at a temperature of about 70° C. to about 90° C. for about 1 minute to about 10 minutes to remove a solvent and to form a film.

(2) Exposure

The resultant film is irradiated by an actinic ray such as a UV ray at about 190 nm to about 450 nm, for example about 200 nm to about 400 nm after putting a mask with a set or predetermined shape to form a desired or suitable pattern. The irradiating is performed by utilizing a light source such as a mercury lamp with a low pressure, a high pressure, or an ultrahigh pressure, a metal halide lamp, an argon gas laser, and/or the like. An X ray, an electron beam, and/or the like may be also utilized as needed.

Exposure process uses, for example, a light dose of about 500 mJ/cm$^2$ or less (with a 365 nm sensor) when a high-pressure mercury lamp is utilized. However, the light dose may vary depending on types (kinds) of each component of the curable composition, its combination ratio, and a dry film thickness.

(3) Development

After the exposure process, an alkali aqueous solution is utilized to develop the exposed film by dissolving and removing an unnecessary part (unnecessary for the development of the image pattern) except the exposed part (i.e., the exposed part remains), thereby forming an image pattern. For example, when the alkali developing solution is utilized for the development, a non-exposed region is dissolved, and an image color filter pattern is formed.

(4) Post-Treatment

The developed image pattern may be heated again or irradiated by an actinic ray and/or the like for curing, in order to accomplish excellent or suitable quality in terms of heat resistance, light resistance, close-contacting properties, crack-resistance, chemical resistance, high strength, storage stability, and/or the like.

Hereinafter, the present disclosure is illustrated in more detail with reference to examples. These examples, however, are not in any sense to be interpreted as limiting the scope of the present disclosure.

Synthesis of Ligands

Synthesis of Compound (Second Ligand) Represented by Chemical Formula E-2

100 g of PH-4 (Hannong Chemical Inc.) was added in a 2-necked round-bottom flask and sufficiently dissolved in 300 mL of tetrahydrofuran (THF). 15.4 g of NaOH and 100 mL of water were injected at 0° C. and then, sufficiently dissolved, until a clear solution was obtained. A solution obtained by dissolving 73 g of para-toluene sulfonic chloride in 100 mL of THF was slowly injected at 0° C. Injection was carried out for 1 hour, and the obtained mixture was stirred at room temperature for 12 hours. When a reaction was completed, an excessive amount of methylene chloride was added thereto and then, stirred, and a $NaHCO_3$ saturated solution was added thereto, which was followed by extraction, titration, and water removal. After removing the solvent, the residue was dried in a dry oven for 24 hours. 50 g of the dried product was placed in a 2-necked round-bottom flask and sufficiently stirred in 300 mL of ethanol. Subsequently, 27 g of thiourea was added thereto and dispersed therein and then, refluxed at 80° C. for 12 hours. Then, an aqueous solution prepared by dissolving 4.4 g of NaOH in 20 mL of water was injected thereinto, while further stirred for 5 hours, an excessive amount of methylene chloride was added thereto, and then, a hydrochloric acid aqueous solution was added thereto, which was sequentially followed by extraction, titration, water removal, and solvent removal. The obtained product was dried in a vacuum oven for 24 hours, obtaining a compound represented by Chemical Formula E-2.

Chemical Formula E-2

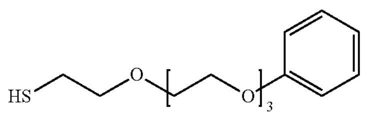

Synthesis of Compound (Second Ligand) Represented by Chemical Formula E-3

100 g of triethylene glycol monomethyl ether was added in a 2-neck round-bottom flask and sufficiently dissolved it in 300 mL of THF. 36.6 g of NaOH and 100 mL of water were added thereto at 0° C. and then, sufficiently dissolved, until a clear solution was obtained. A solution obtained by dissolving 127 g of para-toluene sulfonic chloride in 100 mL of THF was slowly injected at 0° C. Injection was carried out for 1 hour, and the obtained mixture was stirred at room temperature for 12 hours. When a reaction was completed, an excessive amount of methylene chloride was added thereto and then, stirred, and a $NaHCO_3$ saturated solution was added thereto, which was followed by extraction, titration, and water removal. After removing the solvent, the residue was dried in a dry oven for 24 hours. 50 g of the dried product was placed in a 2-necked round-bottomed flask and sufficiently stirred in 300 mL of ethanol. Subsequently, 58 g of thiourea was added thereto and dispersed therein and then, refluxed at 80° C. for 12 hours. Then, an aqueous solution prepared by dissolving 18.5 g of NaOH in 20 mL of water was injected thereinto, while further stirred for 5 hours, an excessive amount of methylene chloride was added thereto, and then, a hydrochloric acid aqueous solution was added thereto, which was sequentially followed by extraction, titration, water removal, and solvent removal. The obtained product was dried in a vacuum oven for 24 hours, obtaining a compound represented by Chemical Formula E-3.

Chemical Formula E-3

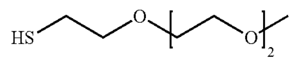

Synthesis of Compound (Second Ligand) Represented by Chemical Formula E-4

100 g of $MePO(EO)_2$ (Hannong Chemical Inc.) was added in a 2-necked round-bottomed flask and sufficiently dissolve in 300 mL of THF. 1.5 equivalents of NaOH and 150 mL of water were added thereto, and the resultant was sufficiently stirred under ice bath conditions. A solution obtained by dissolving 1.2 equivalents of para-toluene sulfonyl chloride in 100 mL of THF was slowly injected at 0° C. Injection was carried out for 1 hour, and the obtained mixture was stirred at room temperature for 15 hours. When a reaction was completed, 300 mL of water and 500 mL of methylene chloride were added thereto and then, stirred, and a $NaHCO_3$ saturated solution was added thereto, which was followed by extraction, titration, and water removal. After removing the solvent, the residue was dried in a dry oven for 24 hours. 50 g of the dried product was placed in a 2-necked round-bottom flask and sufficiently stirred in 300 mL of ethanol. Then, 3.5 equivalents of thiourea (TCI) was added thereto and then, refluxed at 100° C. for 15 hours. Then, an aqueous solution prepared by dissolving 4.4 g of NaOH in 20 mL of water was injected thereinto, while further stirred for 6 hours, an excessive amount of methylene chloride was added thereto, and then, a hydrochloric acid aqueous solution was added thereto, which was sequentially followed by extraction, titration, water removal, and solvent removal. The obtained product was dried in a vacuum oven for 24 hours, obtaining a compound represented by Chemical Formula E-4.

Chemical Formula E-4

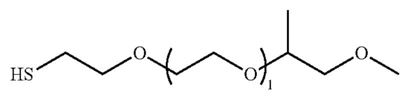

Preparation of Surface-Modified Quantum Dots

Preparation Example 1

After putting a magnetic bar in a 3-necked round-bottom flask, green quantum dot dispersion solution (InP/ZnSe/ZnS, Hansol Chemical; quantum dot solid content (e.g., amount) of 23 wt %) was put therein. Herein, the compound represented by Chemical Formula E-1 (TH1550-Mercaptopropyl isobutyl POSS, Hybridplastics) and the compound represented by Chemical Formula E-2 were added in a weight ratio of 1:9, and stirred at 80° C. in a nitrogen atmosphere. When a reaction was completed, after decreasing the temperature down to room temperature (23° C.), the quantum dot reaction solution was added to cyclohexane, thereby forming precipitates. The precipitates were separated from the cyclohexane through centrifugation and then, sufficiently dried in a vacuum oven for one day, thereby obtaining surface-modified green quantum dots.

Chemical Formula E-1

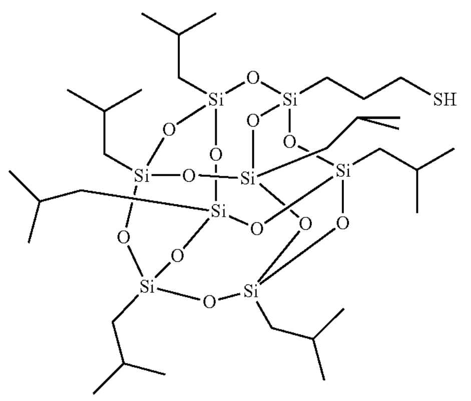

Preparation Example 2

Surface-modified green quantum dots were prepared in substantially the same manner as in Preparation Example 1 except that the compound represented by Chemical Formula E-1 and the compound represented by Chemical Formula E-2 were utilized in a weight ratio of 2:8 instead of the weight ratio of 1:9.

Preparation Example 3

Surface-modified green quantum dots were prepared in substantially the same manner as in Preparation Example 1 except that the compound represented by Chemical Formula E-1 and the compound represented by Chemical Formula E-2 were utilized in a weight ratio of 3:7 instead of the weight ratio of 1:9.

Preparation Example 4

Surface-modified green quantum dots were prepared in substantially the same manner as in Preparation Example 1 except that the compound represented by Chemical Formula E-1 and the compound represented by Chemical Formula E-2 were utilized in a weight ratio of 5:5 instead of the weight ratio of 1:9.

Preparation Example 5

Surface-modified green quantum dots were prepared in substantially the same manner as in Preparation Example 2 except that the compound represented by Chemical Formula E-3 was utilized instead of the compound represented by Chemical Formula E-2.

Preparation Example 6

Surface-modified green quantum dots were prepared in substantially the same manner as in Preparation Example 2 except that the compound represented by Chemical Formula E-4 was utilized instead of the compound represented by Chemical Formula E-2.

Comparative Preparation Example 1

Surface-modified green quantum dots were prepared in substantially the same manner as in Preparation Example 1 except that the compound represented by Chemical Formula E-1 was not included.

Comparative Preparation Example 2

Surface-modified green quantum dots were prepared in substantially the same manner as in Preparation Example 1 except that the compound represented by Chemical Formula E-2 was not utilized.

Preparation of Curable Compositions

Curable compositions according to Examples 1 to 6 and Comparative Examples 1 and 2 were prepared based on each of the following components.

(A) Quantum Dots (A-1) Surface-modified green quantum dots prepared in Preparation Example 1

(A-2) Surface-modified green quantum dots prepared in Preparation Example 2

(A-3) Surface-modified green quantum dots prepared in Preparation Example 3

(A-4) Surface-modified green quantum dots prepared in Preparation Example 4

(A-5) Surface-modified green quantum dots prepared in Preparation Example 5

(A-6) Surface-modified green quantum dots prepared in Preparation Example 6

(A-7) Surface-modified green quantum dots prepared in Comparative Preparation

Example 1

(A-8) Surface-modified green quantum dots prepared in Comparative Preparation

Example 2

(B) Polymerizable Compound

Compound represented by Chemical Formula 3-2 (M200, Miwon Chemical)

Chemical Formula 3-2

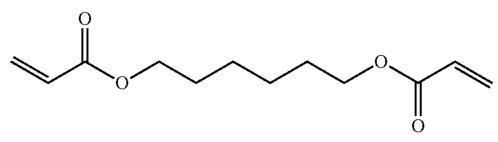

(C) Photopolymerization Initiator

TPO-L (Polynetron)

(D) Light Diffusing Agent

Titanium dioxide dispersion (rutile type or kind $TiO_2$; D50 (180 nm), solid content (e.g., amount) 50 wt %, Iridos Co., Ltd.)

(E) Polymerization Inhibitor

Methyl hydroquinone (TOKYO CHEMICAL)

Examples 1 to 6 and Comparative Examples 1 and 2

As an example, the surface-modified green quantum dots and the polymerizable compound were mixed and stirred for 12 hours. A polymerization inhibitor was added and stirred for 5 minutes. Then, when necessary, a photopolymerization initiator was added and then a light diffusing agent was added.

(Taking Example 1 as an example, 41 g of the surface-modified green quantum dots were mixed with 41 g of a compound represented by Chemical Formula 3-2 as the polymerizable compound and then, stirred to prepare green quantum dot dispersion, 10.95 g of another curable monomer by Chemical Formula 3-2 and 0.05 g of a polymerization inhibitor were added thereto and then, stirred for 5 minutes, and subsequently, 3 g of a photopolymerization initiator, and 4 g of a light diffusing agent were added thereto and then, stirred, preparing a curable composition (ink).)

Specific (representative) compositions are shown in Table 1.

TABLE 1

| (unit: wt %) | | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|
| Quantum dot | (A-1) | 41 | — | — | — | — | — | — | — |
| | (A-2) | — | 41 | — | — | — | — | — | — |
| | (A-3) | — | — | 41 | — | — | — | — | — |
| | (A-4) | — | — | — | 41 | — | — | — | — |
| | (A-5) | — | — | — | — | 41 | — | — | — |
| | (A-6) | — | — | — | — | — | 41 | — | — |
| | (A-7) | — | — | — | — | — | — | 41 | — |
| | (A-8) | — | — | — | — | — | — | — | 41 |
| Polymerizable compound | | 51.95 | 51.95 | 51.95 | 51.95 | 51.95 | 51.95 | 51.95 | 51.95 |
| Polymerization inhibitor | | 0.05 | 0.05 | 0.05 | 0.05 | 0.05 | 0.05 | 0.05 | 0.05 |
| Photopolymerization initiator | | 3 | 3 | 3 | 3 | 3 | 3 | 3 | 3 |
| Light diffusing agent | | 4 | 4 | 4 | 4 | 4 | 4 | 4 | 4 |

Evaluation

Each curable composition according to Examples 1 to 6 and Comparative Examples 1 and 2 were spin-coated by 2 mL on a glass substrate at 1,500 rpm and then, exposed at 5 J in a nitrogen UV exposer for 9 seconds to form a 9 μm-thick QD film, and the QD film was measured with respect to an initial blue light conversion rate (initial retention rate) by utilizing a light efficiency meter (QE-2100, Otsuka Electronics Co., Ltd.), and then, the substrate having the QD film was baked on a hot plate at 180° C. under a nitrogen atmosphere for 30 minutes and for 1 hour, respectively and cooled to room temperature (23° C.) for 3 hours. Subsequently, the light efficiency meter was utilized to remeasure the blue light conversion rate thereof (retention rate after baking), which was utilized to calculate a thermal process retention rate (%) according to the following calculation equation, and the results are shown in Table 2.

Thermal process retention rate (%)=[retention rate after baking/initial retention rate]* 100

TABLE 2

| | Initial retention rate (%) | Thermal process retention rate after additional baking for 30 min (%) | Thermal process retention rate after additional baking for 1 hour (%) |
|---|---|---|---|
| Example 1 | 98 | 97.3 | 96.7 |
| Example 2 | 99 | 98.3 | 98.3 |
| Example 3 | 99 | 98.1 | 97.7 |
| Example 4 | 100 | 98.0 | 97.1 |
| Example 5 | 99 | 97.1 | 96.2 |
| Example 6 | 99 | 97.4 | 96.5 |
| Comparative Example 1 | 98 | 96.0 | 95.1 |
| Comparative Example 2 | 98 | 94.5 | 93.9 |

Referring to Table 2, the curable compositions according to Examples 1 to 6, compared with the curable compositions according to Comparative Examples 1 and 2, exhibited excellent or suitable heat-resistance reliability due to minimized or reduced deterioration of the thermal process retention rate after the thermal curing process.

The use of "may" when describing embodiments of the present disclosure refers to "one or more embodiments of the present disclosure."

As used herein, the singular forms "a", "an" and "the" are intended to include the plural forms as well, unless the context clearly indicates otherwise.

In the present disclosure, when particles are spherical, "size" indicates an average particle diameter, and when the particles are non-spherical, the "size" indicates a major axis length. The size of the particles may be measured utilizing a scanning electron microscope or a particle size analyzer. As the particle size analyzer, for example, HORIBA, LA-950 laser particle size analyzer, may be utilized. When the size of the particles is measured utilizing a particle size analyzer, the average particle diameter (or size) is referred to as D50. D50 refers to the average diameter (or size) of particles whose cumulative volume corresponds to 50 vol % in the particle size distribution (e.g., cumulative distribution), and refers to the value of the particle size corresponding to 50% from the smallest particle when the total number of particles is 100% in the distribution curve accumulated in the order of the smallest particle size to the largest particle size.

As used herein, the term "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this disclosure is intended to include all higher numerical limitations subsumed therein. Accordingly, Applicant reserves the right to amend this disclosure, including the claims, to expressly recite any sub-range subsumed within the ranges expressly recited herein.

The display device or any other relevant devices or components according to embodiments of the present disclosure described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the embodiments of the present disclosure.

Although the embodiments of the present disclosure have been described, it is understood that the present disclosure should not be limited to these embodiments, but one or more suitable changes and modifications can be made by one ordinary skilled in the art within the spirit and scope of the present disclosure as defined by the following claims and equivalents thereof.

REFERENCE NUMERALS

1 first ligand
2 second ligand
3 quantum dot

What is claimed is:

1. A curable composition, comprising:

a quantum dot surface-modified with a first ligand and a second ligand having a structure different than the first ligand; and a polymerizable compound, wherein the first ligand is a silsesquioxane-based thiol ligand and the second ligand is represented by Chemical Formula 2, and wherein the first ligand and the second ligand are each independently attached directly to a surface of the quantum dot;

Chemical Formula 2

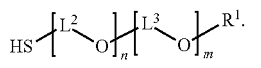

wherein, in Chemical Formula 2, $R^1$ is a substituted or unsubstituted C1 to C20 alkyl group, a substituted or unsubstituted C3 to C20 cycloalkyl group, a substituted or unsubstituted C6 to C20 aryl group, or a combination thereof, $L^2$ and $L^3$ are each independently a substituted or unsubstituted C1 to C20 alkylene group, a substituted or unsubstituted C3 to C20 cycloalkylene group, a substituted or unsubstituted C6 to C20 arylene group, or a combination thereof, and n and m are each independently an integer from 0 to 100, and $n+m\neq 0$.

2. The curable composition of claim 1, wherein the silsesquioxane-based thiol ligand is a cage silsesquioxane-based thiol ligand.

3. The curable composition of claim 1, wherein the silsesquioxane-based thiol ligand comprises a structural unit represented by Chemical Formula 1:

Chemical Formula 1

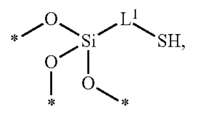

wherein, in Chemical Formula 1, $L^1$ is an ether linking group, a sulfide linking group, a substituted or unsubstituted C1 to C20 alkylene group, a substituted or unsubstituted C3 to C20 cycloalkylene group, a substituted or unsubstituted C6 to C20 arylene group, or a combination thereof.

4. The curable composition of claim 3, wherein the first ligand is represented by Chemical Formula 1-1:

Chemical Formula 1-1

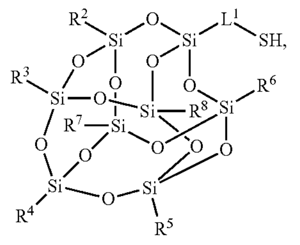

wherein, in Chemical Formula 1-1, $L^1$ is an ether linking group, a sulfide linking group, a substituted or unsubstituted C1 to C20 alkylene group, a substituted or unsubstituted C3 to C20 cycloalkylene group, a substituted or unsubstituted C6 to C20 arylene group, or a combination thereof, and $R^2$ to $R^8$ are each independently a substituted or unsubstituted C1 to C20 alkyl group, a substituted or unsubstituted C3 to C20 cycloalkyl group, a substituted or unsubstituted C6 to C20 aryl group, or a combination thereof.

5. The curable composition of claim 1, wherein a content of the first ligand on the surface of the quantum dot is less than or equal to a content of the second ligand.

6. The curable composition of claim 1, wherein a weight ratio of the first ligand to the second ligand on the surface of the quantum dot is about 1:9 to about 5:5.

7. The curable composition of claim 1, wherein the second ligand is a thiol ligand having a structure different from that of the first ligand.

8. The curable composition of claim 1, wherein in Chemical Formula 2, $R^1$ is a substituted or unsubstituted C6 to C20 aryl group.

9. The curable composition of claim 1, wherein in Chemical Formula 2, $R^1$ is a substituted or unsubstituted C1 to C20 alkyl group, and $L^2$ and $L^3$ are the same.

10. The curable composition of claim 1, wherein in Chemical Formula 2, $R^1$ is a substituted or unsubstituted C1 to C20 alkyl group, and $L^2$ and $L^3$ are different from each other.

11. The curable composition of claim 1, wherein the curable composition is a solvent-free curable composition.

12. The curable composition of claim 11, wherein the solvent-free curable composition comprises about 5 wt % to about 60 wt % of the modified quantum dot surface; and about 40 wt % to about 95 wt % of the polymerizable compound, based on the total amount of the solvent-free curable composition.

13. The curable composition of claim 1, wherein the curable composition further comprises a polymerization initiator, a light diffusing agent, a polymerization inhibitor, or a combination thereof.

14. The curable composition of claim 13, wherein the light diffusing agent comprises barium sulfate, calcium carbonate, titanium dioxide, zirconia, or a combination thereof.

15. The curable composition of claim 1, wherein the curable composition further comprises a solvent.

16. The curable composition of claim 15, wherein the curable composition comprises about 1 wt % to about 40 wt % of the modified quantum dot surface; about 1 wt % to about 20 wt % of the polymerizable compound; and about 40 wt % to about 80 wt % of the solvent based on the total weight of the curable composition.

17. The curable composition of claim 1, wherein the curable composition further comprises malonic acid; 3-amino-1,2-propanediol; a silane-based coupling agent; a leveling agent; a fluorine-based surfactant; or a combination thereof.

18. A cured layer manufactured using the curable composition of claim 1.

19. A color filter comprising the cured layer of claim 18.

20. A display device comprising the color filter of claim 19.

* * * * *